United States Patent [19]
Frische et al.

[11] Patent Number: 5,367,067
[45] Date of Patent: Nov. 22, 1994

[54] WATER-RESISTANT STARCH MATERIALS FOR THE PRODUCTION OF CAST SHEETS AND THERMOPLASTIC MATERIALS

[75] Inventors: Rainer Frische, Frankfurt am Main; Renate Gross-Lannert, Dietzenbach; Klaus Wollmann, Eschenhofen; Bernd Best, Moerfelden, all of Germany; Eduard Schmid, Bonaduz; Fritz Buehler, Thusis, both of Switzerland

[73] Assignee: EMS-Inventa AG, Zurich, Switzerland

[21] Appl. No.: 958,103

[22] Filed: Mar. 1, 1993

[30] Foreign Application Priority Data

Apr. 30, 1991 [DE] Germany ............... 4114185

[51] Int. Cl.$^5$ .......... C08L 3/06; C08K 5/10; C08J 5/18
[52] U.S. Cl. .................. 536/45; 536/48; 106/206
[58] Field of Search .............. 536/45, 48; 106/206

[56] References Cited

U.S. PATENT DOCUMENTS 3,795,670  3/1974  Mark et al. .................. 536/110
5,043,196  8/1991  Lacourse et al. ............. 428/35.6

FOREIGN PATENT DOCUMENTS 2031500  4/1990  Canada .
0394803  4/1990  European Pat. Off. .
4013344  4/1990  Germany .
91/00313  1/1991  WIPO .

OTHER PUBLICATIONS

Štěpek et al, Additives for Plastics, Springer-Verlag Publs., 1983 pp. 23–24.

*Primary Examiner*—Nathan M. Nutter
*Attorney, Agent, or Firm*—Beveridge, DeGrandi, Weilacher & Young

[57] ABSTRACT

Water-resistant, thermoplastic starch materials which are processable into environmentally safe, thermoplastically produced products and cast sheets. They consist of starch acyl compounds, obtainable from high amylose starches and their derivatives (being sparingly soluble in water), and of plasticizers (like citric acid ethyl ester, glycerol acetate and lactic acid ester), which have a gelatinizing effect, and preferably, a dissolution property resulting in brilliant transparence and, as can be proved, are biodegradable.

11 Claims, No Drawings

WATER-RESISTANT STARCH MATERIALS FOR THE PRODUCTION OF CAST SHEETS AND THERMOPLASTIC MATERIALS

INTRODUCTION AND BACKGROUND

The present invention relates to water resistant, thermoplastic, starch materials which can be processed into environmentally safe products, particularly moldings and thermoplastically produced sheets as well as cast sheets.

Starch esters, particularly acetates, have been known for a long period of time. A distinction is made between highly substituted starch acetates having a degree of substitution (DS) of 2-3 and low-substituted starch acetates having a DS up to a maximum of 1. Whereas highly substituted starch acetates have not yet gained any technical importance, low-substituted starch acetates are well-established commercial products.

Known acetates having a high degree of substitution (DS 2.5-3) are cellulose and amylose triacetates. As described in the literature, the properties of films consisting of amylose triacetate are similar to those made of cellulose triacetate. These films were made of chloroform.

The process used to produce starch acetates, according to methods and common practices in the chemical industry, is also generally known and described in numerous citations (e.g., by using acetic anhydride, acetic anhydride pyridine, mixtures consisting of acetic anhydride and glacial acetic acid, ketene, vinyl acetate, and acetic acid; potato and corn starch being the predominantly used starches). Relatively long reaction times, and drastic reaction conditions, had to be accepted to obtain highly substituted derivatives.

Especially disadvantageous in connection with these processes is the strong decomposition of the starch molecules into relatively short chains which no longer have the film-forming properties typical of starch.

Little has been written about the production of high amylose starch acetate having a high degree of substitution. A paper by Mark and Mehltretter is found in U.S. Pat. No. 3,795,670 and in the corresponding publication "Facile Preparation of Starch Triacetates" in the journal *Starke* (1972), Issue No. 3, pages 73-100. A commercially available, high amylose corn starch from National Starch, having an amylose content of about 70%, was used as the starch. By avoiding the above conventional processes and substance components used therein, the goal of complete acetylization was obtained by the well-calculated selection of the catalyst, variation of its quantity, and with a reaction time of approximately 5 hours. The acetate which was obtained after 5 hours, having a degree of substitution of 3, could be cast together with a dichloromethane solution into flexible, transparent sheets. Although no other high amylose starches were used, it was assumed that the general process, as indicated, would be usable for high amylose starches with the same course and results, and that the resulting starch triacetates could furthermore be converted into fibers.

However, as expected, the triacetates obtained by this process, as well as sheets produced therefrom, are not fully biodegradable and/or compostable within acceptable periods of time; no advantage over cellulose acetates has been observed in respect to this point.

SUMMARY OF THE INVENTION

The object of this invention is to provide starch materials which have the following characteristics: distinguish themselves by a high technical (utility) value; can be processed into cast sheets and also thermoplastically into moldings and sheets which are environmentally safe; and, when exposed to environmental forces, will completely decompose into natural substances which do not create any lasting environmental hazard.

This problem is solved by a water-resistant, thermoplastic starch material which can be processed into environmentally safe, thermoplastically produced products and cast sheets. It is characterized in that it consists of at least one starch acyl compound (sparingly soluble in water and made of amylose-rich starches and the derivatives thereof) and at least one plasticizer effecting gelation and which is biodegradable.

The invention further provides a process for the production of starch material as outlined above, which is characterized in that the acyl components (particularly the long-chain fatty acids) are simultaneously or successively reacted with the starch in a one-pot reaction without isolation of the intermediate products. A process is also provided for the production of starch material as described above, which is characterized in that the acyl components (particularly the long-chain fatty acids), are simultaneously or successively reacted with the starch in a one-pot process without isolation of the intermediate products, the starch acyl compound is then obtained from the reaction product by means of solution fractionation. Another alternative relates to a process for the production of thermoplastic sheets and moldings by extrusion or injection molding in a known manner utilizing the starch material as outlined above, wherein the plasticizer(s) of the starch acyl compound are preferably not added until the material is fed into the processing means. One embodiment concerns a process for the production of cast sheets in a known manner utilizing the starch material as described above, which is characterized in that ethyl acetate, ethyl lactate, n-butyl acetate, chloroform, methylene chloride, acetone, ethyl acetoacetate, acetylacetone, and the mixtures thereof are used as the solvent.

A further process relates to the use of the above-described starch material for the production of thermoplastic sheets and moldings by extrusion, injection molding and calendering. Finally, this invention concerns the use of the starch material as outlined above for the production of cast sheets.

DETAILED DESCRIPTION OF THE INVENTION

The inventors have found that in order to be able to produce transparent, flexible cast sheets, the former demand for complete acetate formation (and thus a necessary starch acetate substitution degree of 3) could be dropped when using plasticizers and special corn starches as well as the now available cultivated high amylose corn and pea starches. This is true even though the latter do not differ from the corn starch type used in the above process according to U.S. Pat. No. 3,795,670 as regards their amylose content.

It is also surprizing that uniform, thermoplastically processable materials can be obtained at all when such starches (comprised preferably of 70% amylose and 30% amylopectin) are used as a result of the corresponding amylose products.

In the direct acetate formation of high amylose corn starch (i.e., without subsequent DS adjustment as is necessary in the case of cellulose acetates), it is possible to produce materials which not only form clear solutions in organic solvents from which clean, transparent sheets can be made, but which also supply clear materials when processed thermoplastically.

When the degree of substitution of the acetates (which are obtained from the employed corn starches and have these properties) was determined, values around 2.5 and down to 2.2 were established and which are markedly below a DS value of 3. This is all the more surprising because these values are decidedly lower than those of the pure amylose and cellulose acetates; it having been assumed, according to the state of the art, that these values are absolutely necessary for the sheet production and quality. Corresponding to the cited process, until now the person skilled in the art also assumed that acetate derivatives having a degree of substitution of less than 3, and obtained by direct acetate formation without new saponification, do not form clear solutions as is also the case for many cellulose acetates. However, according to the present invention, when the plasticizers are used it is possible to directly produce the desired products from the corn starch acetate (plus plasticizer) with such low DS values.

According to the invention, surprisingly and contrary to the assumptions made in the cited process, when another high amylose starch (e.g., high amylose pea starch) is used, a high amylose pea starch acetate, having properties markedly different from those of the corn starch, is obtained with equal reaction conditions.

In this connection, the high amylose pea starch proved to be a much more favorable raw material. Substitution degrees of approximately 2.5 are obtained after a reaction time of only 2 hours, which together with the plasticizer properties result in a material of the desired type. In this way, the substitution degree can be reduced even below 2.5 without deterioration of the properties of the resulting materials. By means of prolonged reaction times, it is possible to increase the DS value up to 3, and correspondingly reduce the plasticizer addition if desired, owing to certain demands made as to the end products.

By the addition of the plasticizer, effects were obtained which could not be foreseen. For example, the brittleness of the starch acetates is reduced due to the plasticizer(s) effecting reversible gelation, without sustained influence and/or reduction in the strength thereof, as is usually the case. Accordingly, only the substances previously mentioned have been established as plasticizers. The plasticizers under consideration are starch acetate-dissolving liquids, preferably having low vapor pressure; they have the necessary gelation capacity and/or a low strength-reducing effect, as well as a dissolving property, which results in a brilliant transparency and, as can be proved, are at the same time fully biodegradable.

The following is stated concerning the above-mentioned reversible gelation. According to the invention, increasing the amount of plasticizers in combination with the solid starch acetates lead, in the case of mechanical thorough mixing (kneading, shaking, stirring), initially to a strong swelling of the solid starch acetates, then to extremely tough, sticky compositions, and finally to transparent viscous quasi-solutions which form gels when allowed to stand. These gels are again converted into quasi-homogeneous solutions by renewed mechanical and additional heating (optional). This applies to mixtures of starch acetate plus plasticizer(s) as well as the addition of suitable, highly volatile solvents for the cast sheet production. It has been found that the temporal stability of the solutions is sufficient for the desired processes. For example, even those solutions can be drawn out homogeneously as films at room temperature; which, when allowed to stand at room temperature, would form gels that are no longer castable and capable of being drawn-out homogeneously. The drawn-out solution films dry to form brilliantly transparent sheets, the gel formation also being the decisive factor for the brilliance of the sheets.

The required low vapor pressure is, of course, not based on the vapor pressure of the individual components but corresponds to the effective vapor pressure of the mixture.

In addition, it has been found that compositions which are completely decomposable (e.g., by means of the ethyl esters of citric acid, lactic acid and the glycerol acetates as well as the phosphoric esters employed as plasticizers) can be produced and processed into clear moldings by means of common plastic processing machines such as extruders, calenders and injection molders.

A biodegradation test carried out in compost soil with the derivative per se, and the sheets and moldings produced therefrom, resulted in a rapid attack and decay of the material so that compostability can be assumed. In this regard, the plasticizers which were added for processing proved to be of decisive importance for creating attacking components and decay-promoting conditions which determine the degradation behavior.

It is also possible to produce clear, transparent, very flexible, and fully biodegradable sheets from organic solvents such as ethyl acetate. It is preferred to use 5 to 20% solutions, based on the sum of plasticizer and starch acetate, the ratio of plasticizer to starch acetate preferably ranging from 0.5 to 50%. Surprisingly, the mixtures without additional solvent can be calendered successfully, with temperatures far below the extrusion temperatures being more than sufficient to give brilliantly transparent sheets. Thus calendering, extruding and also injection molding are possible by use of the plasticizer and starch acetate alone.

According to the invention, novel starch materials and products having different properties are obtained by minor additions of relatively long-chain fatty acids (e.g., palmitic or stearic acid in the form of the free acids and/or as fatty acid chlorides) during the acetate formation by means of the starch fat acyl compound (e.g., acetic anhydride or the corresponding mixed anhydrides). For example, sheets and moldings can be made from these derivatives, which, as compared to those made from pure high amylose corn starch acetates and pure high amylose pea starch acetates, have a markedly greater flexibility, dimensional stability, pliability, and wear resistance.

Along with the advantage resulting from the further improvement of the starch acetate/plasticizer material by introducing the relatively long-chain fatty acids (particularly the natural fatty acids having 12–22 carbon atoms or the derivatives thereof), there is also the technical advantage that this process does not render the simple production of the material more labor intensive, time-consuming or costly. Since it had to be initially assumed that the introduction of the fatty acids into the reaction product would not readily be possible, a one-pot reaction is also possible in the matter of this especially advantageous modification of the material (i.e., simultaneously or successively reacting the components, particularly the long-chain fatty acids, with the starch in a one-pot reaction without isolation of the intermediate products).

By fractionation of the starch acyl compound solution, it is also possible to produce specific materials, having differing properties, which can be processed thermoplastically into sheets and moldings.

In addition to said starches, particularly those having an amylose content of over 70%, the resultant derivatives, such as hydroxypropyl and hydroxyethyl starches having a low DS value of 0.1 to 0.2, are also usable according to the invention as a raw material for acetate formation.

The below examples clarify the simple production of the materials according to the invention, as well as their excellent suitability as starting materials for cast sheets and thermoplastic moldings having unlimited biodegradability. Solvents which are used for the cast sheet production are selected from ethyl acetate, ethyl lactate, n-butyl acetate, chloroform, methylene chloride, acetone, ethyl acetoacetate, acetylacetone, and mixtures thereof.

EXAMPLES

Example 1

Production of high amylose corn acetate 460 g of Hylon VII are supplied to a 10 liter, four-neck flask with a reflux condenser, drip funnel, and thermometer, and is blended by stirring with 1500 ml of acetic anhydride. After about 5 minutes of thorough mixing, 88 g of 50% NaOH are added dropwise. Then the mixture is heated until a constant reflux occurs. The boiling temperature is approximately 125° C.; in this regard, overheating (which may lead to burning of the starch to the flask rim) is to be avoided.

After 1 to 2 hours, the viscosity increases until, after 3 to 4 hours, a tough, brownish, clear composition has formed. After a period of about 5 hours (i.e., the required reaction time), 50 to 100 ml of acetic acid are distilled off at 118° C. and thereafter 200 ml of ethanol are added dropwise. Then stirring takes place for another 30 minutes with slightly reduced heating, and thereafter about 100ml of the resulting solvent mixture (consisting of acetic ester and acetic acid forming when ethanol is reacted with acetic anhydride) are distilled off at 102° to 105° C. Then heating is discontinued and the composition is allowed to cool for 0.5 to 1 hour. Following this, 200 ml of ethanol are again added dropwise. Thereafter, precipitation is slowly carried out with about 2 liters of methanol. The product is washed several times with alcohol, the alcohol is then withdrawn, and the product dried in air. For further processing, the product is finely ground and screened.

The yield was repeatedly from 670 to 680 g. The determined DS value was approximately 2.7 (2.5–2.9). The desired materials used for cast sheets and thermoplastic moldings can be provided by adding the indicated plasticizers before or during further processing.

The process, in which relatively large amounts have already been used in laboratory tests, can readily be applied to normal outputs in the kilogram range by distilling off the solvent mixture prior to the alcohol precipitation.

EXAMPLE 2

Production of pea starch acetate

As in Example 1, 150 g of pea starch are suspended in 600g of acetic anhydride, and 33g of 50% sodium hydroxide solution is slowly dropwise. The reaction time required to obtain an acceptable starch acetate, having a DS value of 1.86, is only 0.5 hour; it is well usable for the material.

A well usable starch acetate having a DS value of 2.61 is obtained after 2 hours.

By means of this formula, a cast sheet obtained by using 30% of citric acid ethyl ester (Citroflex 2) as the plasticizer, is transparent and pliable.

EXAMPLE 3

Starch acetate material on the basis of Hylon VII with palmitic acid chloride and glycerol acetate 23 g of Hylon VII are supplied to a four-neck flask and blended by stirring with 80 g of acetic anhydride. Then 4.4 g of 50% NaOH solution are added dropwise. After a reaction time of 2 hours, 3.44 g of palmitic acid chloride are slowly added dropwise and the mixture is stirred for another 3 hours. Isolation is carried out as described in Example 1. The determined DS value is approximately 2.5.

7 g of this starch acetate were then blended with 3 g of glycerol acetate and pressed at 180° C. for 2 minutes without pressure and 2 minutes with pressure (5 tons) to give a clear, elastic sheet that could be deep-drawn.

EXAMPLE 4

Starch acetate material on the basis of Hylon VII with palmitic acid and glycerol acetate 23 g of Hylon VII are supplied to a four-neck flask and blended by stirring with 80 g of acetic anhydride and 8 g of palmitic acid. After a reaction time of 5 hours, the product is isolated as described in Example 1. The DS value is around 2.5.

7 g of this starch acetate were then blended with 3 g of glycerol acetate and pressed at 180° C. for 2 minutes without pressure and 2 minutes with pressure (5 tons) to give a clear, elastic sheet that could be deep-drawn.

On the one hand, Examples 3 and 4 show that the substitution of the acetate by fatty acid is not restricted to certain portions. On the other hand, it becomes evident that in the one-pot reaction the fatty acid component can be used both from the very beginning and later on in the process.

Numerous other relatively long-chain fatty acids such as $C_6-C_{24}$, saturated, monounsaturated and polyunsaturated (as occurring in natural oils and fats), can be substituted in place of palmitic acid and its chloride.

EXAMPLE 5

Production of a cast sheet 80 g of solvent mixture consisting of 80% by volume of acetone and 20% by volume of ethyl lactate are supplied to a 250 ml, two-necked flask having a reflux condenser. 6 g of citric acid ethyl ester or 6 g of glycerol acetate are added and the mixture is thoroughly stirred. Then 14 g of starch acetate, produced according to one of the preceding examples, are weighed and added, and the mixture is heated to approximately 80° C. while being vigorously stirred. When dissolution is completed, after 15 minutes to approximately 1 hour, pressure filtration may be used for purification. Thereafter, the product, in a thickness of about 700 μm, is spread onto a glass plate by means of a coating knife. The dried sheet has a thickness of about 50 μm and is hung up for approximately 2 hours after drying for the purpose of homogenization.

Acetic ester can also be used instead of the solvent mixture, and in the laboratory it is also possible to use chloroform. Sheets obtained in this manner exhibit an even better brilliance. Additions of triphenylphosphate, triallylphosphate, tricresylphosphate, ethyl acetoacetate and acetylacetone have a positive effect on the material properties of the resulting sheets.

When a solvent mixture consisting of 70% by volume of acetone, 20% by volume of ethyl lactate and 10% by volume of butylacetate is used, sheets are obtained having a leathery surface structure.

EXAMPLE 6

Production of a pressed sheet 7 g of starch acetate are blended vigorously with 3 g of citric acid ethyl ester and then placed between two teflon disks at 200° C. on a thermopress, initially for 2 minutes without pressure and then for 2 minutes with a pressure of 5 tons. The sheets thus produced can be deep-drawn.

EXAMPLE 7

Processing of the material in an extruder

Citric acid ethyl ester, the compatible plasticizer, is not premixed with the starch acetate (e.g., according to the above examples), but is directly supplied in doses to the extruder during processing. The temperature setting of the extruder was adjusted as follows: Zone I cold, Zones II and III 150° C., Zones IV and V 100° C., and Zone VI 150° C. The temperature of the mixture was 149° C. and, with a speed of 151 rpm, the pressure was 10 bar. The nozzle diameter was 3 mm.

The material is easily processed. It was possible to cool the extruded strand in a water bath. Cutting it into pellets did not pose any problems.

Modifications of the processing pressure (e.g., by nozzle diameter variations) showed that the machine settings are widely variable, so that the person skilled in the art can determine the optimum operating parameters for the special material composition consisting of starch acetate and plasticizer, depending on the amounts used in each case.

The above examples describe only a small portion of the total number of usable substances and their quantity ratios. For example, NaOH was always used as the catalyst. However, it must be assumed that another alkaline solution can be employed as well. The DS value depends on the reaction time and also on the solution fractionation. Although not necessary for this material, this value can be raised to over 2.7 in the case of pea starch if this is favorable to the products to be manufactured (less plasticizer). Nevertheless, these few examples show that the full acetate formation is no longer necessary. In particular, the time required for the production of the starch acetate component of the material can be advantageously reduced and simplified. Furthermore, the DS value is also influenced by the substitution of fatty acyl component portions by relatively long-chain fatty acids. Thus, it is possible to further lower the DS value without lessening the quality of the product.

According to the invention, further examples of calendering the material are described below:

EXAMPLE 8

35 g of starch acetate 15 g of ethyl citrate are thoroughly mixed and processed into sheets on a rolling mill or calendar which has been adjusted to 105° C.

EXAMPLE 9

35 g of starch acetate 15 g of glycerol triacetate are thoroughly mixed and processed into sheets on a rolling mill or calendar (100° C.).

EXAMPLE 10

35 g of starch acetate 15 g of glycerol triacetate 1.5 g of adipic acid dimethyl ester are thoroughly mixed and processed into sheets on a rolling mill or calendar (105° C.).

EXAMPLE 11

35 g of starch acetate 10 g of glycerol triacetate 5 g of benzyl butyl phthalate are thoroughly mixed and processed into sheets on a rolling mill or calendar (140° C.).

The starch acetate referred to is a high amylose corn starch with the trade name being Hylon VII. As described above, this starch is derivatized to form the corresponding acetate.

The plasticizers indicated in the examples can be mixed with one another in varying combinations (e.g., the combination of benzyl butyl phthalate and ethyl citrate is also possible even though it is not specifically mentioned); the plasticizer amounts may also vary. An amount of up to about 50% of plasticizer can be blended with the starch acetate with the composition becoming too soft only when this value is exceeded.

We claim:

1. A water-resistant, thermoplastic starch material processable into environmentally safe, thermoplastically produced products and cast sheets, comprising (a) at least one acyl modified starch or derivative thereof, said acyl modified starch having a degree of substitution of at least 1.86, is sparingly soluble in water and is prepared from the reaction of (i) high amylose starch having an amylose content of greater than or equal to 70% and (ii) an acylation agent which is a free acid or chloride or anhydride of at least one fatty acid, and (b) at least one biodegradable plasticizer.

2. The starch material according to claim 1, wherein said acyl modified starch is based on corn starch and has a degree of substitution of about 2.5.

3. The starch material according to claim 1 wherein said acyl modified starch is based on pea starch and has a degree of substitution of up to 3.0.

4. The starch material according to claim 1, wherein said acyl modified starch has a degree of substitution of ≧2.0 and said acylation agent is acetic anhydride.

5. The starch material according to claim 1, wherein said fatty acid has 12 to 22 carbon atoms.

6. The starch material according to claim 1, wherein said plasticizer is about 0.5 to 50% by weight, based on said acyl modified starch.

7. The starch material according to claim 6, wherein said plasticizer is selected from the group consisting of ethyl citrate, glycerol acetate, phosphoric acid ester, ethyl lactate and mixtures thereof.

8. The starch material according to claim 1, wherein said acyl modified starch is based on pea starch and has a substitution degree of about 2.5.

9. The starch material according to claim 1, wherein said fatty acid is selected from the group consisting of saturated, monounsaturated and polyunsaturated fatty acids having $C_6$ to $C_{24}$ atoms.

10. The starch material according to claim 1, wherein the portion of said fatty acid amounts up to 35% by weight based on said high amylose starch.

11. The starch material according to claim 1, wherein said acyl modified starch is based on corn starch and has a degree of substitution of 2.2 to about 2.5.

* * * * *